United States Statutory Invention Registration [19]

[11] Reg. Number: H380

Yokocho

[43] Published: Dec. 1, 1987

[54] TRIMMER

[75] Inventor: Yoetsu Yokocho, Ome, Japan

[73] Assignee: Kioritz Corporation, Tokyo, Japan

[21] Appl. No.: 913,594

[22] Filed: Sep. 30, 1986

Related U.S. Application Data

[63] Continuation of Ser. No. 733,482, May 13, 1985, abandoned.

[30] Foreign Application Priority Data

May 25, 1984 [JP] Japan ..... 59-75930[U]

[51] Int. Cl.[4] ..... B26B 7/00

[52] U.S. Cl. ..... 30/276; 464/52

[58] Field of Search ..... 30/276; 464/52, 57, 464/173

[56] References Cited

U.S. PATENT DOCUMENTS 4,126,928 11/1978 Hoff ..... 464/52 X 4,286,675 9/1981 Tuggle ..... 30/276 X 4,295,272 10/1981 Kubota ..... 30/276

*Primary Examiner*—Deborah L. Kyle

*Assistant Examiner*—Richard W. Wendtland

*Attorney, Agent, or Firm*—Browdy and Neimark

[57] ABSTRACT

A trimmer including a flexible shaft extending through a hollow straight operation rod for transmitting driving power from a prime mover to a gear chamber. A clearance is defined between an inner wall surface of the hollow operation rod and an outer peripheral surface of the flexible shaft.

3 Claims, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TRIMMER

This application is a continuation of application Ser. No. 733,482, filed May 13, 1985, now abandoned.

BACKGROUND OF THE INVENTION

This invention relates to a trimmer for cutting bash or grass.

In a trimmer of a straight rod type equipped with a gear chamber for driving a cutter blade when a cutting operation is performed, it has hitherto been usual practice to use a hollow operation rod formed of an aluminum alloy of high strength, and a rigid shaft formed of carbon steel to serve as a transmission shaft which extends through the interior of the hollow operation rod and is journalled by four or five bearings. This type of trimmer has suffered the following disadvantages. To minimize vibration that might occur during operations, the parts should be assembled with a high degree of precision. During operations, the operator should be careful not to bend the operation rod. Moreover, the trimmer itself is rather heavy in weight and high in cost.

SUMMARY OF THE INVENTION

This invention has as its object the provision of a trimmer of the type described which obviates the aforesaid disadvantages of the trimmer of the prior art.

The aforesaid object is accomplished according to the invention by using a flexible shaft as a transmission shaft in place of the rigid shaft that has hitherto been used.

DESCRIPTION OF THE PREFERRED EMBODIMENT

A preferred embodiment of the invention will now be described by referring to the accompanying drawings.

Figure 2:
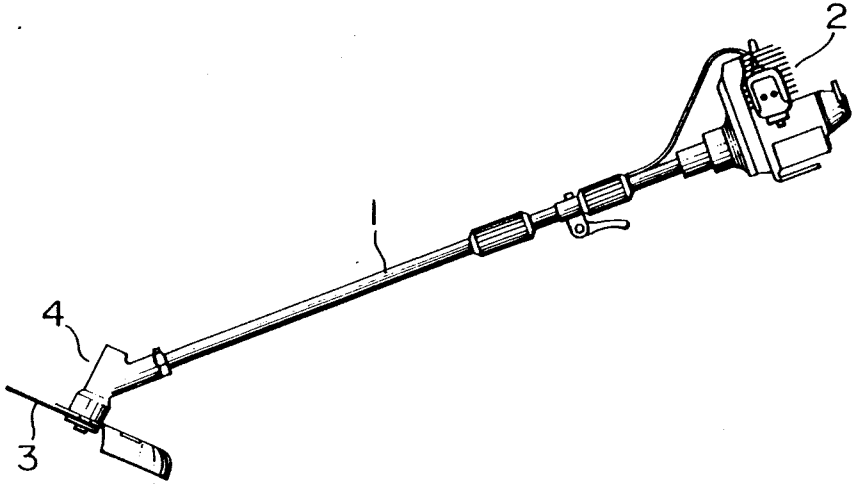
FIG. 2 is a side view of the trimmer shown in FIG. 1, showing the construction of the trimmer as a whole.

Referring to FIG. 2 which shows the trimmer according to the invention in a side view, a hollow straight operation rod 1 formed of an aluminum alloy or a synthetic resinous material to have strength which is an essential minimum and does not interfere with cutting operations performed by the trimmer supports at its upper end a prime mover 2 which may be a two-cycle gasoline engine and at its lower end a gear chamber 4 for driving a cutter blade 3 when the cutting operations are performed.

Figure 1:
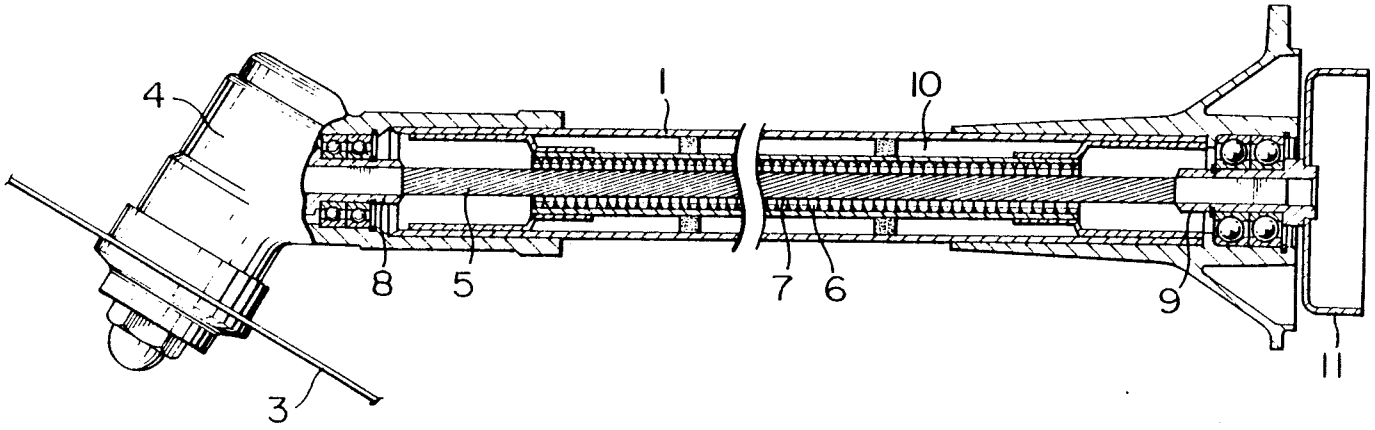
FIG. 1 is a sectional view of the essential portions of one embodiment of the trimmer in conformity with the invention.

Referring to FIG. 1 which shows the essential portions of the trimmer according to the invention in a side view, a flexible shaft 5 extending through the interior of the hollow operation rod 1 is coupled at one end to a boss 8 of a driving gear (not shown) in the gear chamber 4 in a manner to be prevented from relative angular movement and at an opposite end to a boss 9 of a clutch drum 11 for the prime mover 2 in a manner to be prevented from relative angular movement, and a liner 6 formed as of a synthetic resinous material is fitted over an outer peripheral surface of the flexible shaft 5.

Grease 7 is filled between the outer peripheral surface of the flexible shaft 5 and an inner peripheral surface of the liner 6 to absorb heat which might be generated during the operations. A clearance of about 1 mm is defined between an outer peripheral surface of the liner 6 and an inner wall surface of the hollow operation rod 1.

From the foregoing description, it will be appreciated that the trimmer according to the invention is relatively light in weight and easy to handle and capable of minimizing vibration which might occur during the cutting operations.

What is claimed is:

1. A trimmer comprising:
   - a hollow straight operation rod;
   - a prime mover supported at an upper end of said hollow operation rod;
   - a gear chamber supported at a lower end of said hollow operation rod to drive a cutter blade when a cutting operation is performed;
   - a flexible shaft extending through the interior of said hollow rod along substantially the full length thereof for transmitting driving power from said prime mover to said gear chamber;
   - a straight liner fitted along substantially the full length of said flexible shaft over an outer peripheral surface of said flexible shaft, said liner being spaced apart from an inner peripheral surface of said hollow operation rod by a suitable clearance along substantially the full length thereof and fixed to the hollow operation rod at both ends thereof.

2. The trimmer of claim 1 wherein said liner is formed of a synthetic resinous material.

3. The trimmer of claim 1 further comprising space between the outer peripheral surface of said flexible shaft and an inner peripheral surface of said liner being filled with grease.

* * * * *